(12) United States Patent
Yang et al.

(10) Patent No.: US 11,858,308 B2
(45) Date of Patent: Jan. 2, 2024

(54) VEHICLE WARMER

(71) Applicants: HYUNDAI MOTOR COMPANY, Seoul (KR); KIA MOTORS CORPORATION, Seoul (KR)

(72) Inventors: Hyeon Kyu Yang, Hwaseong-si (KR); Man Ju Oh, Yongin-si (KR); So La Chung, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 418 days.

(21) Appl. No.: 17/188,180

(22) Filed: Mar. 1, 2021

(65) Prior Publication Data
US 2022/0105778 A1   Apr. 7, 2022

(30) Foreign Application Priority Data

Oct. 7, 2020 (KR) .................. 10-2020-0129691

(51) Int. Cl.
*B60H 1/00* (2006.01)
*H05B 1/02* (2006.01)
*H05B 3/34* (2006.01)

(52) U.S. Cl.
CPC ....... *B60H 1/00264* (2013.01); *H05B 1/0202* (2013.01); *H05B 1/0236* (2013.01); *H05B 3/34* (2013.01); *H05B 2203/016* (2013.01)

(58) Field of Classification Search
CPC B60H 1/00264; B60H 1/2227; H05B 1/0202; H05B 1/0236; H05B 3/34; H05B 3/06; H05B 2203/016; H05B 2203/032; B60R 16/005; B60R 16/03
See application file for complete search history.

(56) References Cited

U.S. PATENT DOCUMENTS

| | | | |
|---|---|---|---|
| 2011/0006050 A1* | 1/2011 | Nee | H05B 6/36 219/203 |
| 2020/0269655 A1* | 8/2020 | Yen | B60H 1/2227 |

FOREIGN PATENT DOCUMENTS

| | | | | |
|---|---|---|---|---|
| DE | 102010011102 A1 | * | 9/2011 | ........... B60H 1/2225 |
| DE | 102010063595 A1 | * | 6/2012 | ......... B60H 1/00271 |
| DE | 102022000267 A1 | * | 3/2022 | |
| JP | 2017-087892 A | | 5/2017 | |
| KR | 20-0353909 Y1 | | 6/2004 | |
| KR | 10-2018-0060154 A | | 6/2018 | |

* cited by examiner

*Primary Examiner* — Shawntina T Fuqua
(74) *Attorney, Agent, or Firm* — Lempia Summerfield Katz LLC

(57) ABSTRACT

A vehicle warmer includes: a housing provided within a vehicle; a heat generation film normally accommodated within the housing, and configured to be spread out from the housing when in use, and to generate heat when electricity is supplied; an electricity supply unit supplying electricity to the heat generation film; and a switching unit provided between the electricity supply unit and the heat generation film to enable electricity to flow from the electricity supply unit to the heat generation film when the heat generation film is spread out from the housing.

12 Claims, 4 Drawing Sheets

VEHICLE WARMER

CROSS REFERENCE TO RELATED APPLICATION

This application claims priority to and the benefit of Korean Patent Application No. 10-2020-0129691, filed on Oct. 7, 2020, the entire contents of which are incorporated herein by reference.

FIELD

The present disclosure relates to a vehicle warmer capable of being used inside or outside of a vehicle.

BACKGROUND

The statements in this section merely provide background information related to the present disclosure and may not constitute prior art.

In addition to an air conditioning device, existing vehicles each are equipped with a short-distance non-contact heating device using an infrared radiation heating element. Generally, such a heating device is made up of a covering material, a heating element, an insulation material, and a base material. The heating device is fixed on an interior trim. When the heating device is in use, the appearance thereof is always exposed. Accordingly, a design has an influence on selection of the covering material, and the presence of parting lines spoils the appearance of the heating device.

The performance of the heating device is determined by a surface temperature, a distance to a heated portion, a heat generation area, and the like. We have discovered that since a heating device in the related art is fixed on the interior trim and the appearance thereof is exposed, such a heating device has a disadvantage of maintaining a design of the interior. Accordingly, this disadvantage imposes a limitation on the distance to the heated portion and the heat generation area that are primary factors for improving heating performance. Thus, it is difficult to effectively provide heating.

The foregoing is intended merely to aid in the understanding of the background of the present disclosure, and is not intended to mean that the present disclosure falls within the purview of the related art that is already known to those skilled in the art.

SUMMARY

The present disclosure provides a vehicle warmer in which a housing is provided on a predetermined portion within the vehicle, a heat generation film is accommodated within the housing and is spread out to generate heat only when in use, and a reflective film positioned a distance away from a rear surface of the heat generation film reflects radiant heat. The vehicle warmer can prevent heat loss and can adjust a distance to a heated portion and a heat generation area, thereby effectively providing heating.

According to an aspect of the present disclosure, a vehicle warmer includes: a housing provided within a vehicle; a heat generation film normally accommodated within the housing, and configured to be spread out from the housing when in use, and to generate heat when electricity is supplied thereto; an electricity supply unit supplying electricity to the heat generation film; and a switching unit provided between the electricity supply unit and the heat generation film and configured to operate to enable electricity to flow from the electricity supply unit to the heat generation film when the heat generation film is spread out from the housing.

In the vehicle warmer, a shaft may be provided within the housing, the heat generation film of which a first one portion is connected to the shaft may be normally accommodated within the housing in a state of being rolled up on the shaft, and when the shaft is rotated, a second end portion of the heat generation film is slid out of the housing to spread out the heat generation film.

In the vehicle warmer, a return spring may be provided at a first end portion of the shaft, and the shaft may be rotated in a first direction when the heat generation film is spread out from the housing and may be rotated in a direction opposite to the first direction by an elastic force of the return spring when the heat generation film is accommodated within the housing.

In the vehicle warmer, a reflective film may be provided at a first side surface of the heat generation film, the reflective film may be accommodated within the housing in a state of being in close contact with the heat generation film when the heat generation film is accommodated within the housing, and when the heat generation film is spread out the reflective film may be positioned a distance away from the heat generation film and reflects heat generated from the heat generation film.

In the vehicle warmer, a tensioner may be provided within the housing, and when the heat generation film is spread out the tensioner may separate the reflective film that is in close contact with the heat generation film from the heat generation film.

In the vehicle warmer, the electricity supply unit may be connected to the heat generation film through a plurality of wires provided in an internal space of the shaft and comprising positive and negative poles, and the wires through which the electricity is supplied may be connected to first and second ends, respectively, of the heat generation film.

In the vehicle warmer, an insulation portion may be provided along a longitudinal direction of the shaft in the internal space of the shaft, the plurality of wires may be arranged inside and outside, respectively, of the insulation portion, and the insulation portion may prevent a short circuit from occurring between the wires.

In the vehicle warmer, the switching unit may include: a fixation portion; and a spring unit connected to the fixation portion, when the heat generation film is spread out from the housing, the fixation portion may be engaged with a predetermined portion within the vehicle, and thus the heat generation film may be kept spread out, and the spring unit may connect the electricity supply unit and when the fixation portion is engaged with the predetermined portion within the vehicle, the heat generation film to each other.

In the vehicle warmer, the switching unit may be provided on a first end portion of the shaft at a position spaced apart from the electricity supply unit, and when the shaft is rotated and the heat generation film is spread out, the switching unit may be moved forward and is brought into contact with the electricity supply unit, thereby connecting the electricity supply unit and the heat generation film to each other.

In the vehicle warmer, a temperature controller may be provided at a first end portion of the heat generation film, when electricity is supplied to the heat generation film, the temperature controller may measure a temperature value of the heat generation film, and when the temperature value of the heat generation film is increased to a predetermined reference value or above, the temperature controller may control the switching unit in such a manner that the electricity supply unit and the heat generation film are disconnected from each other.

In the vehicle warmer, a link portion may be provided adjacent to a first side surface of the heat generation film, and the heat generation film is spread out from the housing or may be accommodated within the housing by an operation of the link portion.

In the vehicle warmer, the housing may be provided on a floor, a roof, a door, or a seat of the vehicle, and the heat generation film may be spread out toward a predetermined portion of the vehicle and generates heat.

In the vehicle warmer, the electricity supply unit may be a battery provided within the housing, the housing may be configured to be separated from the floor, the roof, the door, or the seat of the vehicle, and the heat generation film is supplied with electricity from the battery in a state where the housing is separated from the floor, the roof, the door, or the seat of the vehicle.

In the vehicle warmer according to one form of the present disclosure, the housing is provided at a predetermined position within the vehicle, a heating film is accommodated within the housing and is spread out to generate heat only when in use, and a reflective film positioned a distance away from a rear surface of the heating film reflects radiant heat. Accordingly, the vehicle warmer can prevent heat loss and can adjust a distance to a heated portion and a heat generation area, thereby effectively providing heating.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
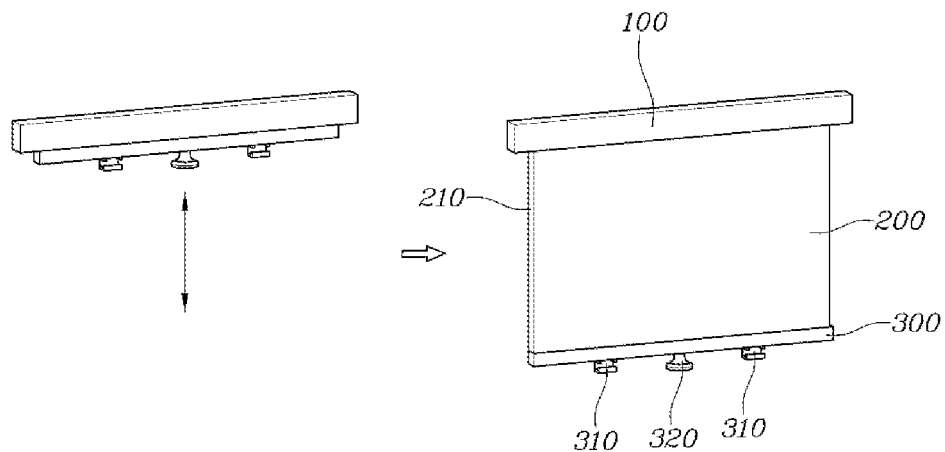
FIG. 1 is a view illustrating that an accommodated heat generation film is spread out in a vehicle warmer according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
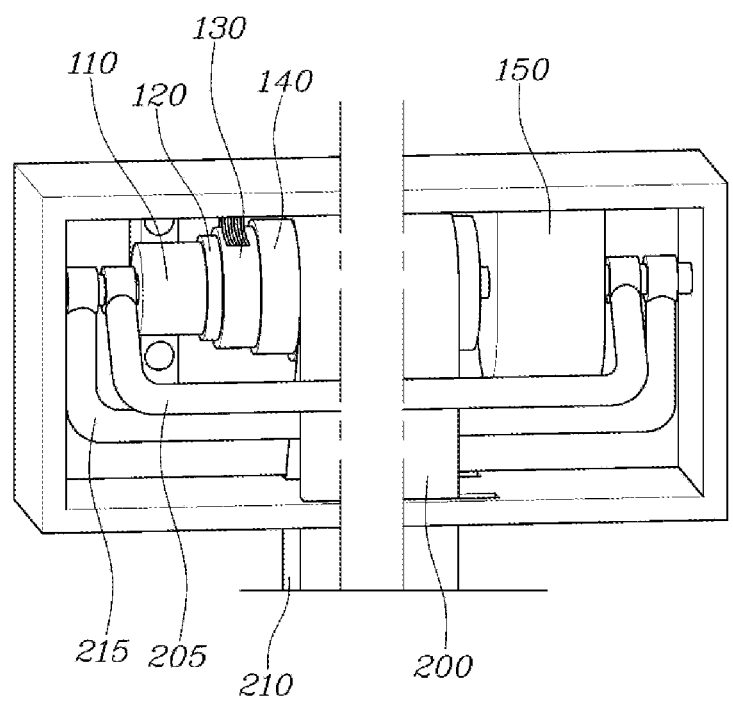
FIG. 2 is a view illustrating opposite inner ends of a housing in the vehicle warmer according to another form of the present disclosure.
Figure 7:
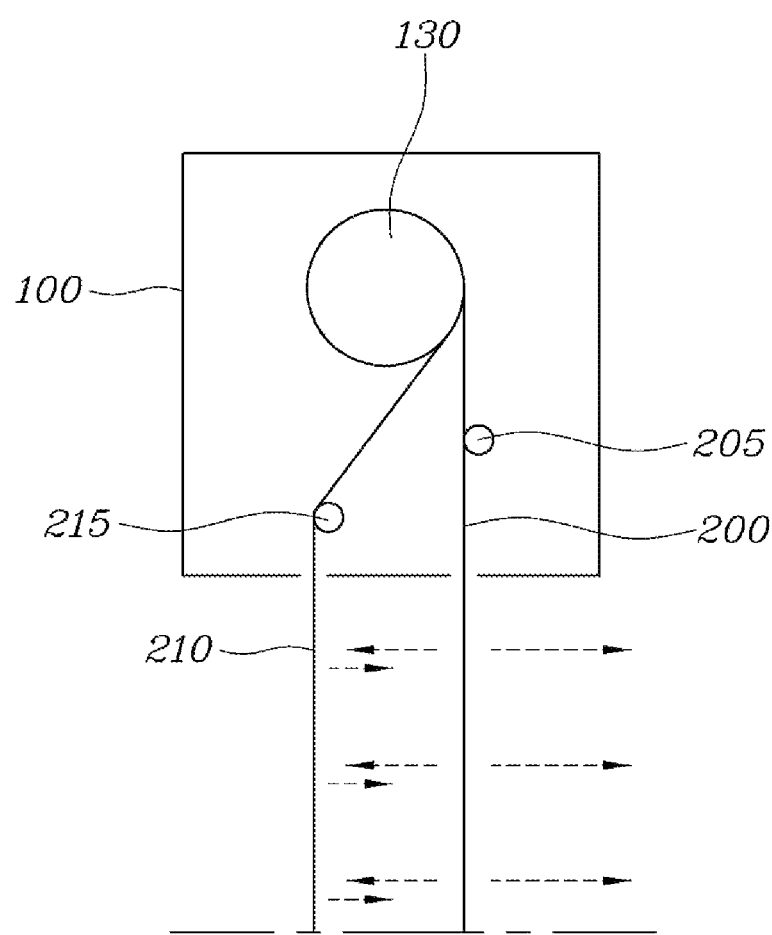
FIG. 7 is a side sectional view illustrating a state where the heat generation film and a reflective film are spread out from the housing in the vehicle warmer according to one form of the present disclosure.

FIG. 1 is a view illustrating that an accommodated heat generation film is spread out in a vehicle warmer according to an exemplary form of the present disclosure. FIG. 2 is a view illustrating opposite inner ends of a housing in the vehicle warmer in another form of the present disclosure. FIG. 7 is a vertical cross-sectional view illustrating a state where the heat generation film and a reflective film are spread out from the housing of the vehicle warmer according to one form of the present disclosure. The vehicle warmer according to one form of the present disclosure includes: a housing 100, a heat generation film 200, an electricity supply unit, and a switching unit. The housing 100 is provided within a vehicle. The heat generation film 200 is normally accommodated within the housing 100, is spread out from the housing 100 when in use, and generates heat when electricity is supplied thereto. The electricity supply unit supplies electricity to the heat generation film 200. The switching unit is provided between the electricity supply unit and the heat generation film 200. When the heat generation film 200 is spread out from the housing 100, the switching unit operates to enable electricity to flow from the electricity supply unit to the heat generation film 200.

Specifically, the housing 100 in the form of a parallelepiped extends transversely, and the heat generation film 200 is rolled up for accommodation within the housing 100. The heat generation film 200 is spread out through a longitudinal hole formed in a first side of the housing 100. A hook-shaped fixation portion 310 and a knob 320 are provided at the second end portion of the heat generation film 200. An occupant in the vehicle spreads out the heat generation film 200 by pulling the knob 320. The heat generation film 200 is spread out, and then the hook-shaped fixation portion 310 is engaged with a predetermined portion within the vehicle. Thus, the heat generation film 200 is prevented from returning to its original position for accommodation within the housing 100.

In one form of the present disclosure, a shaft 130 is provided within the housing 100 in the vehicle warmer. A first end portion of the heat generation film 200 is connected to the shaft 130. The heat generation film 200 is normally accommodated within the housing 100 in the state of being rolled up on the shaft 130. The shaft 130 is rotated, and thus a second end portion of the heat generation film 200 is slid out of the housing 100, thereby spreading out the heat generation film 200. The first end portion of the heat generation film 200 is connected to the shaft 130 and is covered with the shaft cover 140. Then, the shaft 130 is rotated and thus the heat generation film 200 is wound up on the shaft cover 140 for accommodation within the housing 100. Thereafter, as the shaft 130 is rotated in an opposite direction, the heat generation film 200 is unwounded. That is, the heat generation film 200 is spread out from the housing 100 through the longitudinal hole formed in the first side of the housing 100.

In another form, a return spring is provided at a first end portion of the shaft 130 in the vehicle warmer. When the heat generation film 200 is spread out, the shaft 130 is rotated in a first direction. When the heat generation film 200 is accommodated within the housing 100, the shaft 130 is rotated in a direction opposite to the first direction by an elastic force of the return spring 150. The pulling of the knob 320 by the occupant rotates the heat generation film 200 in the first direction. Thus, the heat film 200 is spread out, and the fixation portion 310 is fixedly engaged with the predetermined portion within the vehicle. Thereafter, when the fixation portion 310 is disengaged, the shaft 130 is rotated in the direction opposite to the first direction by the elastic force of the return spring 150. Thus, the heat generation film 200 is normally accommodated within the housing 100 in the state of being rolled up on the shaft 130 without performing any operation.

In another forms, a reflective film 210 is provided on a first side surface of the heat generation film 200 in the vehicle warmer. When the heat generation film 200 is accommodated within the housing 100, the reflective film 210 is accommodated in a state of being in close contact with the heat generation film 200. When the heat generation film 200 is spread out, the reflective film 210 is positioned a distance away from the heat generation film 200 and thus reflects heat generated from the heat generation film 200. Tensioners 205 and 215 are provided within the housing 100 in the vehicle warmer according to one form of the present disclosure. When the heat generation film 200 is spread out, the tensioners 205 and 215 separate the reflective film 210 in close contact with the heat generation film 200 from the heat generation film 200.

With reference to FIG. 7, the reflective film 210 is accommodated in the state of being in close contact with the first side surface of the heat generation film 200. When the heat generation film 200 is spread out, the reflective film 210 is separated by the tensioners 205 and 215 from the heat generation film 200. The housing 100 has longitudinal holes in the first side. The heat generation film 200 and the reflective film 210 pass through the longitudinal holes, respectively. Thus, the reflective film 210, along with the heat generation film 200, is spread out from the housing 100. Here, the reflective film 210 and the heat generation film are separately spread out from the housing 100. The separate spreading-out of the reflective film 210 from the heat generation film 200 prevents the heat generated by the heat generation film 200 from being transferred by conduction to the reflective film 210. The reflective film 210 reflects radiant heat transferred in a direction opposite to a direction in which heating is desired, toward the direction in which heating is desired. Thus, the heating efficiency of the heat generation film 200 is increased.

Figure 3:
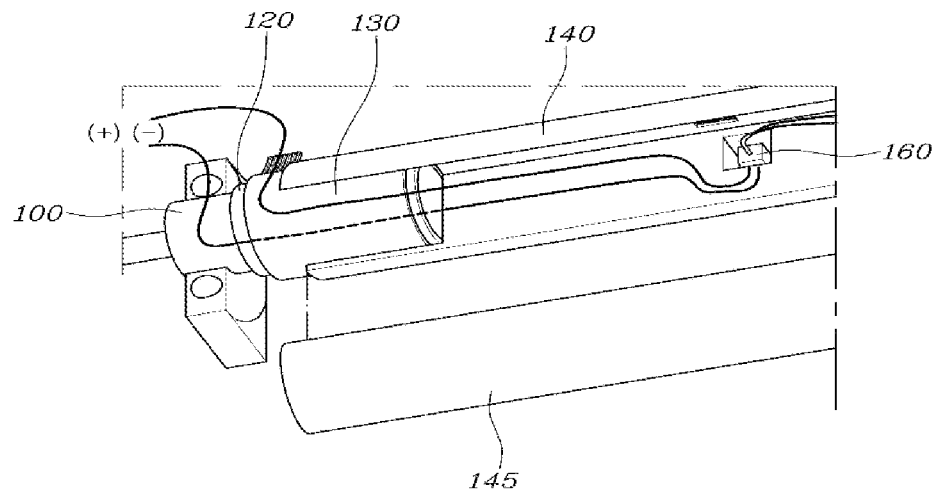
FIG. 3 is a view illustrating that wires are arranged in an inner space of a shaft in the vehicle warmer in one form of the present disclosure.
Figure 5:
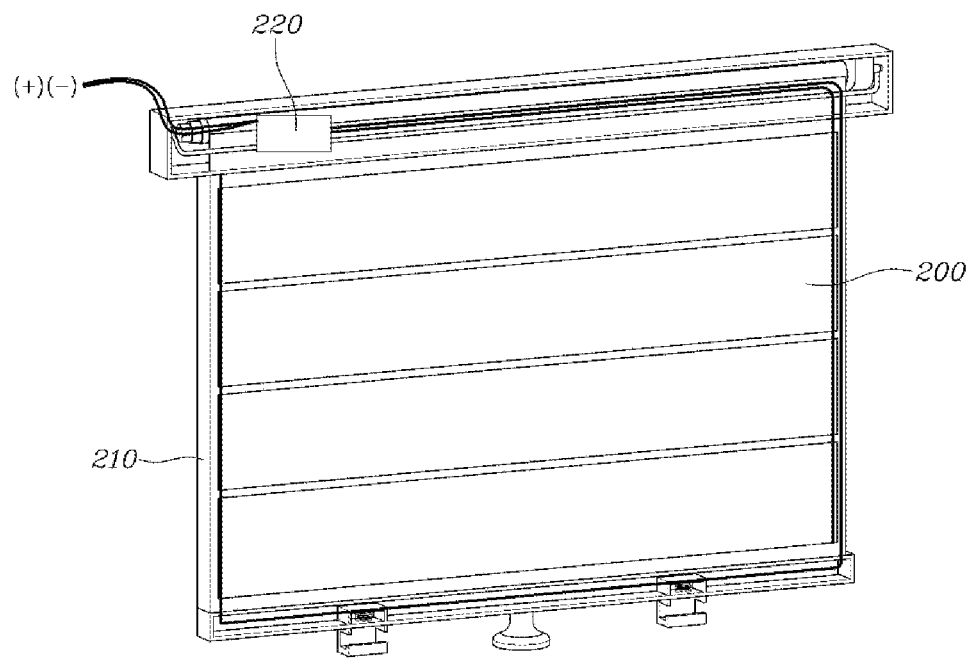
FIG. 5 is a view illustrating the heat generation film connected to an electricity supply unit through a temperature controller and the wires in the vehicle warmer according to another form of the present disclosure.

FIG. 3 is a view illustrating that wires are arranged in an inner space of the shaft 130 in the vehicle warmer according to one form of the present disclosure. FIG. 5 is a view illustrating the heat generation film connected to the electricity supply unit through a temperature controller and the wires in the vehicle warmer according to an exemplary form of the present disclosure. The electricity supply unit is connected to the heat generation film 200 through wires including positive and negative poles, which are arranged in the internal space of the shaft 130, in the vehicle warmer according to another form of the present disclosure. The wires through which the electricity is supplied are connected to first and second ends, respectively, of the heat generation film 200. With reference to FIGS. 3 and 5, one of the wires including the positive and negative poles, which are arranged in the inner space of the shaft 130, is connected to a first end of the heat generation film 200. The other runs along an edge of the heat generation film 200, passes the fixation portion 310, and then is connected to a second end of the heat generation film 200.

The shaft 130 in the vehicle warmer has an insulation portion 120 in the inner space. The insulation portion 120 extends along a longitudinal direction of the shaft 130. The plurality of wires are arranged inside and outside, respectively, of the insulation portion 120. That is, the plurality of wires are arranged a distance away from each other. Thus, the insulation portion 120 prevents a short circuit from occurring between the wires. The shaft 130 in the form of a cylinder extends along a longitudinal direction of the housing 100. The insulation portion 120 in the inner space of the shaft 130 in the form of a cylinder also extends along the longitudinal direction of the housing 100. Accordingly, the wires including the positive and negative poles are positioned inside and outside, respectively, of the cylindrical insulation portion 120 within the cylindrical shaft 130, and vice versa. Thus, a short circuit is prevented from occurring between the wires including the positive and negative poles.

In other form, a temperature controller 220 is provided at the first end portion of the heat generation film 200 in the vehicle warmer. When electricity is supplied to the heat generation film 200, the temperature controller 220 measures a temperature value of the heat generation film 200. When the temperature value of the heat generation film 200 is increased to a predetermined reference value or above, the temperature controller 220 controls the switching unit in such a manner that the electricity supply unit and the heat generation film 200 are disconnected from each other. The temperature controller measures the temperature value of the heat generation film 200 using a temperature sensor provided on the heat generation film 200. When the heat generation film 200 maintains a temperature value equal to or higher than the predetermined reference value for a fixed time or longer, for example, when the heat generation film 200 maintains a temperature of 50° C. or above for three minutes or longer, the temperature controller controls the switching unit in such a manner that the electricity supply unit and the heat generation film 200 is disconnected from each other. Thus, an accident due to overheating of the heat generation film 200 can be prevented.

Figure 4:
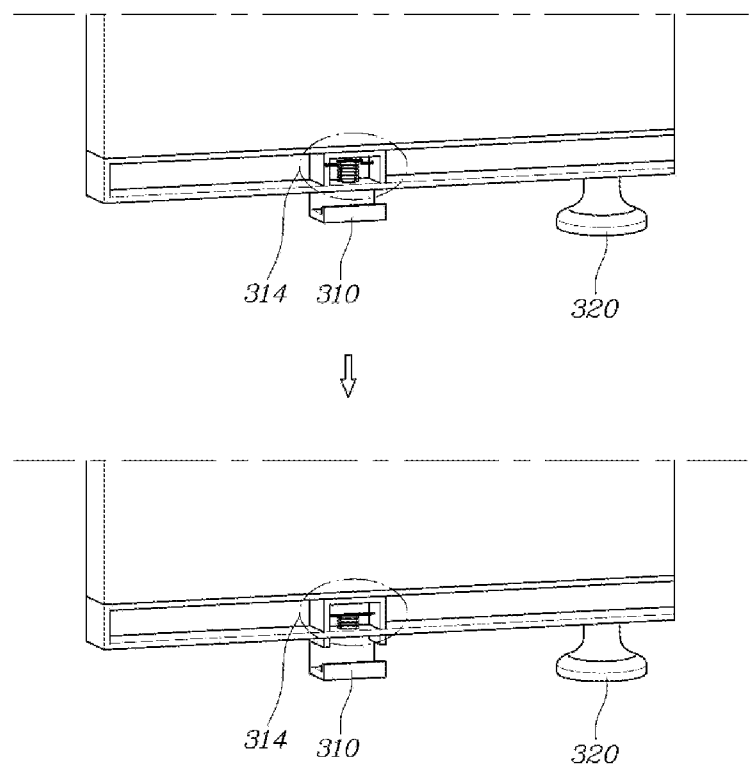
FIG. 4 is a view illustrating a switching unit provided at a second end portion of the heat generation film in the vehicle warmer in one form of the present disclosure.

FIG. 4 is a view illustrating a switching unit provided at a second end portion of the heat generation film in the vehicle warmer according to one form of the present disclosure. The switching unit in the vehicle warmer may be a switching unit that includes the fixation portion 310 and a spring unit 314 connected to the fixation portion 310. When the heat generation film 200 is spread out, the fixation portion 310 is engaged with the predetermined portion within the vehicle. Thus, the heat generation film 200 is kept spread out. When the fixation unit 310 is engaged with the predetermined portion within the vehicle, the spring unit 314 connects the electricity supply unit and the heat generation film 200 to each other.

Specifically, after the heat generation film 200 is spread out, but before the fixation portion 310 is engaged with the predetermined portion within the vehicle, the switching unit does not set up a circuit, and the electricity supply unit is not connected to the heat generation film 200. After the heat generation film 200 is spread out, when the fixation portion 310 is engaged with the predetermined portion within the vehicle and the heat generation film 200 is kept spread out, the elastic force of the return spring 150 provided at the first end portion of the shaft 130 is exerted on the heat generation film 200. When the fixation portion 310 is engaged with the predetermined portion within the vehicle, the elastic force of the return spring 150 is exerted on the spring unit 314 connected to the fixation portion 310. With the elastic force of the spring unit 314 connected to the fixation portion 310, the switching unit is moved downward and thus sets up the circuit, thereby connecting the electricity supply unit to the heat generation film 200. Thus, electricity is supplied to the heat generation film. Thereafter, when the fixation portion 310 is disengaged, the circuit is disconnected. Electricity is no longer supplied to the heat generation film 200. The shaft 130 is rotated by the return spring 150, and thus the heat generation film 200 is normally accommodated within the housing 100 in a state of being rolled up on the shaft 130.

Figure 6:
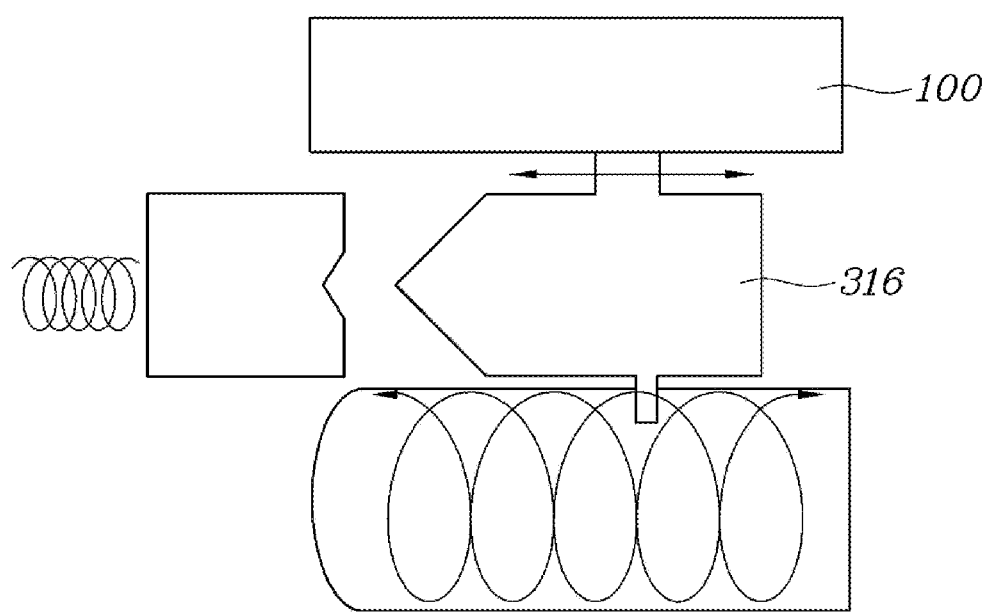
FIG. 6 is a view illustrating a switching unit that is provided at a first end portion of a shaft in the vehicle warmer in one form of the present disclosure.

FIG. 6 is a view illustrating a switching unit that is provided at the first end portion of the shaft 130 in the vehicle warmer according to another form of the present disclosure. The switching unit 316 may be provided to be positioned at the first end portion of the shaft 130 at a position spaced apart from the electricity supply unit in the vehicle warmer according to other form of the present disclosure. When the shaft 130 is rotated and the heat generation film 200 is spread out, the switching unit 316 is moved forward and is brought into contact with the electricity supply unit, thereby connecting the electricity supply unit and the heat generation film 200 to each other. Specifically, with reference to FIG. 6, the housing 100 has a groove in the first side. The switching unit 316 is slid in a backward-forward direction along the groove. The externally threaded shaft 130 is provided to the side, opposite to the housing 100, of the switching unit 316. When the externally threaded shaft 130 is rotated, the switching unit 316 is moved in the backward-forward direction by a worm gear mechanism. The shaft 130 is rotated in the first direction and the heat generation film 200 is spread out. When the switching unit 316 is moved forward and is brought into contact with the electricity supply, the electricity supply unit and the heat generation film 200 are connected to each other, and thus electricity is supplied to the heat generation film 200. When the vehicle warmer is not in use, the shaft 130 is rotated in the direction opposite to the first direction, thereby accommodating the heat generation film 200 back into the housing 100. When the switching unit 316 is moved backward and thus is disconnected from the electricity supply unit, electricity is not supplied to the heat generation film 200.

A link unit is provided the first side surface of the heat generation film 200 in the vehicle warmer according to one form of the present disclosure. The heat generation film 200 may be spread out from the housing 100 or may be accommodated within the housing 100 by an operation of the link unit. The link unit is positioned on an external side surface of the housing 100. The longitudinal holes through which the heat generation film 200 and the reflective film 210 are spread out are formed in the external side surface thereof. Using an actuator, the link unit lengthens and shortens a linkage in a space between the heat generation film 200 and the reflective film 210. Thus, control is performed in a motor-operated manner to spread out from the housing 100 or to accommodate the heat generation film 200 into the housing 100.

The housing 100 in the vehicle warmer may be provided on a floor, a roof, a door, or a seat of the vehicle. The heat generation film 200 is spread out toward a predetermined portion of the vehicle and generates heat. The housing 100 is installable on a predetermined portion, such as a door trim, a seatback cover, a floor carpet, or a roof headlining, in the vicinity of which there is an accommodation space into which to install the housing 100. The heat generation film 200 may operate to be spread out toward the direction in which heating is desired. For example, when the heat generation film 200 is spread out upward from a floor of the vehicle, heat is generated toward an occupant in a direction of a predetermined portion of the vehicle. When the heat generation film 200 is spread out from the door of the vehicle horizontally with respect to the traveling direction of the vehicle, heat is generated toward the floor of the vehicle, that is, toward the knees of the occupant positioned below the heat generation film 200.

The electricity supply unit in the vehicle warmer according to another form of the present disclosure may be a battery provided within the housing 100, and the housing 100 may be separated from the floor of the vehicle or from a roof, a door, or a seat of the vehicle. Electricity may flow from the battery to the heat generation film 200 in a state where the housing 100 is separated from the floor of the vehicle or from the roof, the door, or the seat of the vehicle. Generally, the housing 100 is connected to the predetermined portion within the vehicle and the electricity supply unit that may be an electricity supply unit of the vehicle supplies electricity to the heat generation film 200. However, in a case where a separate battery is built into the housing 100, an occupant can install the housing 100 at any place inside or outside of the vehicle and can spread out the heat generation film 200 in the direction in which heating is desired. This increases user convenience.

Flocking processing is performed on a surface of the heat generation film 200 in the vehicle warmer according to one form of the present disclosure. Thus, when a radiant heating device is in use, the heat generation film is not exposed to the outside, thereby preventing spoiling of the appearance of the radiant heating device and increasing the heating efficiency.

In a case where the vehicle warmer is not in use, the heat generation film 200 is rolled up for accommodation within the housing 100. Thus, the appearance of an internal structure of the vehicle is not spoiled. The heat generation film 200 is spread out in a position of being positioned a desired distance away from a user in the direction in which heating is desired. When the heat generation film 200 is spread out, the reflective film 210, positioned a distance away from a rear surface of the heat generation film 200, reflects forward heat radiated to the rear surface of the heat generation film 200. Thus, the heating efficiency is increased.

Although the exemplary forms of the present disclosure have been described for illustrative purposes, those skilled in the art will appreciate that various modifications, additions and substitutions are possible without departing from the scope and spirit of the present disclosure.

What is claimed is:

1. A vehicle warmer for a vehicle, comprising:
   a housing;
   a heat generation film normally accommodated within the housing, and configured to be spread out from the housing when in use and generate heat when electricity is supplied thereto;
   an electricity supply unit configured to supply the electricity to the heat generation film; and
   a switching unit provided between the electricity supply unit and the heat generation film and configured to enable the electricity to flow from the electricity supply unit to the heat generation film when the heat generation film is spread out from the housing,
   wherein a reflective film is provided on a first side surface of the heat generation film,
   wherein the reflective film is accommodated within the housing in a state of being in close contact with the heat generation film when the heat generation film is accommodated within the housing, wherein when the heat generation film is spread out from the housing, the reflective film is positioned a distance away from the heat generation film and configured to reflect the heat generated from the heat generation film, wherein a tensioner is provided within the housing, and wherein when the heat generation film is spread out, the tensioner is configured to separate the reflective film that is in close contact with the heat generation film from the heat generation film.

2. The vehicle warmer of claim 1, wherein:

a shaft is provided within the housing, the heat generation film having a first end portion connected to the shaft and configured to be accommodated within the housing in a state of being rolled up on the shaft, and when the shaft rotates, a second end portion of the heat generation film is slid out of the housing to spread out the heat generation film.

3. The vehicle warmer of claim 2, wherein:

a return spring is provided at the first end portion of the shaft, and the shaft is rotated in a first direction when the heat generation film is spread out from the housing, and the shaft is rotated in a second direction opposite to the first direction by an elastic force of the return spring such that the heat generation film is accommodated within the housing.

4. The vehicle warmer of claim 2, wherein the electricity supply unit is connected to the heat generation film through a plurality of wires which is provided in an internal space of the shaft and includes positive and negative poles, and wires of the plurality of wires through which the electricity is supplied are connected to first and second ends, respectively, of the heat generation film.

5. The vehicle warmer of claim 4, wherein:

an insulation portion is provided along a longitudinal direction of the shaft in the internal space of the shaft, the wires of the plurality of wires are arranged inside and outside, respectively, of the insulation portion, and the insulation portion is configured to inhibit a short circuit from occurring between the wires.

6. The vehicle warmer of claim 1, wherein the switching unit comprises:

a fixation portion; and a spring unit connected to the fixation portion, and wherein:

when the heat generation film is spread out from the housing, the fixation portion is engaged with a predetermined portion within the vehicle, and thus the heat generation film is kept spread out, and when the fixation portion is engaged with the predetermined portion within the vehicle, the spring unit connects the electricity supply unit and the heat generation film to each other.

7. The vehicle warmer of claim 2, wherein:

the switching unit is provided on a first end portion of the shaft at a position spaced apart from the electricity supply unit, and when the shaft rotates and the heat generation film is spread out, the switching unit is moved forward and is brought into contact with the electricity supply unit, thereby connecting the electricity supply unit and the heat generation film to each other.

8. The vehicle warmer of claim 1, wherein:

a temperature controller is provided at a first end portion of the heat generation film, when the electricity is supplied to the heat generation film, the temperature controller is configured to measure a temperature value of the heat generation film, and when the temperature value of the heat generation film is increased to a predetermined reference value or above, the temperature controller is configured to control the switching unit such that the electricity supply unit and the heat generation film are disconnected from each other.

9. The vehicle warmer of claim 1, wherein:

a link portion is provided adjacent to a first side surface of the heat generation film, and the heat generation film is spread out from the housing or accommodated within the housing by an operation of the link portion.

10. The vehicle warmer of claim 1, wherein:

the housing is provided on a floor, a roof, a door, or a seat of the vehicle, and the heat generation film is spread out toward a predetermined portion of the vehicle and generates heat.

11. The vehicle warmer of claim 10, wherein:

the electricity supply unit is a battery provided within the housing, the housing is separated from the floor, the roof, the door, or the seat of the vehicle, and the heat generation film is supplied with electricity from the battery in a state where the housing is separated from the floor, the roof, the door, or the seat of the vehicle.

12. A vehicle warmer for a vehicle, comprising:

a housing;

a heat generation film normally accommodated within the housing, and configured to be spread out from the housing when in use and generate heat when electricity is supplied thereto;

an electricity supply unit configured to supply the electricity to the heat generation film; and a switching unit provided between the electricity supply unit and the heat generation film and configured to enable the electricity to flow from the electricity supply unit to the heat generation film when the heat generation film is spread out from the housing, wherein the switching unit includes a fixation portion and a spring unit connected to the fixation portion, wherein when the heat generation film is spread out from the housing, the fixation portion is engaged with a predetermined portion within the vehicle, and thus the heat generation film is kept spread out, and wherein when the fixation portion is engaged with the predetermined portion within the vehicle, the spring unit is configured to connect the electricity supply unit and the heat generation film to each other.

* * * * *